United States Patent Office 2,838,579
Patented June 10, 1958

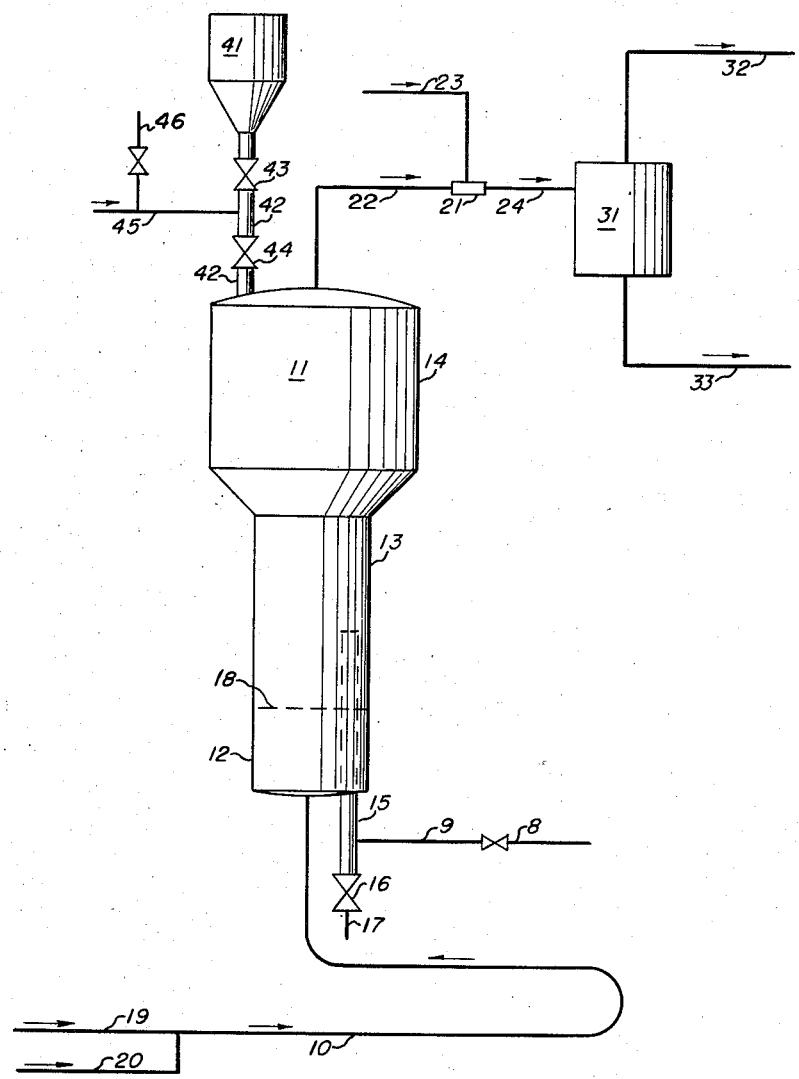

2,838,579

CHLORINATION OF ETHANE

Franklin Conrad, Merle L. Gould, and Clarence M. Neher, Baton Rouge, La., assignors to Ethyl Corporation, New York, N. Y., a corporation of Delaware Application December 13, 1954, Serial No. 474,672

1 Claim. (Cl. 260—662)

This invention relates to the chlorination of alkane hydrocarbons. More specifically, the invention relates to a new and improved technique and process for the chlorination of ethane containing streams to provide valuable chloroethane products.

The chlorination of alkane hydrocarbons has long been recognized as potentially a particularly beneficial and economical method of obtaining valuable materials such as ethyl chloride, the dichloroethanes (1,1- or 1,2-dichloroethane), and the even higher chlorinated ethane compounds such as the trichloroethanes. Despite the recognition of the fundamental economies of the operation, the utilization of the substitution chlorination reaction has not been widespread. Several reasons exist for the failure of chemical industry to take advantage of the known ultimate economies. Most specifically, the chlorination reaction has been considered exceedingly difficult to operate for an extended period without difficulty if the reaction is carried out under the influence or initiation of heat. Photochemically initiated reactions have been successfully carried out, but such processes demand particular care in operation because of the necessity of reaction vessel walls which are transmissive of actinic light, and because of inhibiting effect of numerous impurities frequently found. In cases where a thermally initiated substitution chlorination process has been attempted, difficulty has been widespread in encountering carbon deposition within the reaction space and/or extensive pyrolysis of the desired chloroethane products to produce ethylene and hydrogen chloride. Accordingly, a practical, easily controlled, and simple process for the chlorination of ethane to desired chloroethane products has long been needed.

The object of the present invention is to provide a new and improved process for the chlorination of ethane to produce in high yields and as desired various chloroethane products, viz., ethyl chloride, 1,1-dichloroethane, or the higher chloroethanes if wanted. These products are of well established utility—thus ethyl chloride is widely consumed in the ethylation of lead according to the patent of Kraus and Callis 1,697,245, or for the formation of ethyl cellulose. The dichloroethanes are valuable as intermediates, for example, in the production of vinyl chloride, and the trichloroethanes are useful as degreasing solvents or as source materials for other products. A further object of the present invention is to provide a process for substantially iso-thermal operation in a reaction zone using a fluidized solids volume in substantial excess of the quantity required for the reaction proper as will be amplified hereafter. A further object of specific embodiments of the invention is to provide an improved reaction technique for the adiabatic isothermal chlorination of ethane to realize high yields of ethyl chloride and a minimum amount of undesired by-products. Another object is to provide a process maintainable in an isothermal state during an ethane chlorination even though the process flows can be varied from proportions providing heat balances varying from endothermic through adiabatic to exothermic. Additionally, an object of the invention is to provide a correlation of operating and process variables whereby a fluidized solids medium is provided in the reaction zone in optimum and critical relation to the chlorination reaction in progress. Yet another object is to provide a chlorination of ethane process wherein an elevated pressure is correlated with the temperature of operation and the presence of fluidized solids to provide product distribution results not heretofore attainable in such systems. Another object of specific embodiments of the invention is to provide a method of carrying out a gas phase high pressure operation, without the adverse effect heretofore anticipated under such conditions and obtaining numerous benefits thereby. Still another object is to provide operating conditions, particularly high pressure operation, whereby the subsequent recovery of desired product components and the purification of the product stream is particularly facilitated. Yet an additional object is to provide apparatus particularly suited for the operation of the embodiments of the invention.

It is surprising that for as long as the substitution chlorination of ethane has been recognized as a possible and operable reaction, that it has not been commercially more widely utilized because the ultimate economies have always existed. Particularly, it has always been true that ethane is a lower priced source of the two carbon atom structure for chloroethane derivatives than, for example, ethyl alcohol or ethylene. Some of the earlier patents in this field exhibit recognition of the difficulty encountered. For example, it has long been recognized that a very high excess of ethane to a thermal chlorination reactor, say that corresponding to a ratio of one mole of chlorine to 20 or more moles of ethane, will facilitate in moderating the violence of a chlorination reaction. Unfortunately, employing such copious quantities of excess reactants tends to negate the ultimate economies available. Hence, for some twenty years the major production of ethyl chloride in industry has been by the reaction of hydrogen chloride and ethanol, or by the hydrochlorination of ethylene.

We have now found that the basic inadequacies of methods heretofore proposed for carrying out a substitution ethane chlorination arise from the face that the substitution chlorination is extremely rapid and that with all practical chlorine : ethane ratios the reaction is completed in a space of time of the order of a fraction of a second, and seldom if ever more than one second if the reaction is carried out at sufficiently high temperatures to initiate the chlorination. When the reaction is carried out with chlorine to ethane ratios sufficiently high so that the previously mentioned problem of recovery and recycle copious ethane excess is minimized, then unfortunately the strongly exothermic character of the reaction has heretofore been incapable of being effectively dissipated through walls of a reaction tube and has resulted in pyrolysis of the chloroethane products and in some instances even in complete coking and closing of reaction space particularly if such spaces are tubular conduits. In addition, although pressurized operation would be a tempting device because of its possible simplification of subsequent recovery operations, the above mentioned problems of coking and pyrolysis would be aggravated under conventional operations by pressurized operations, that is, by pressures of the order of 100 to 200 or 250 pounds per square inch gauge.

It has now been discovered that combination of fluidized solids of a certain character and in certain proportions with certain other correlated process conditions will circumvent the foregoing difficulties. Although fluidized solids operations have been widely employed in, particularly, the hydrocarbon processing industries, to, for example, produce gasoline range hydrocarbons for high boiling materials by catalytic treatment, it has not been heretofore appreciated that fluidized solids can be employed in a non-catalytic capacity solely and that in such instances a particular type of solids are highly desirable.

In its most general form, the process of the present invention involves the thorough premixing of gaseous chlorine and ethane containing feed streams and then feeding as a plurality of jets into a cylindrical or uniform area substantially vertical reaction zone. The transverse area of the jets should be not greater than about five percent of the total transverse area of the reaction zone proper and is preferably in the range of about 0.5 to 1.5 percent. The reaction zone contains a fluidized mass of inorganic, carbon coated, highly subdivided solids of from about 0.5 to about 3 feet in depth. The solids can vary appreciably in average particle size and distribution, but in substantially all instances the preferred size distribution is predominantly with solids passing a 60 mesh screen and retained on a 140 mesh screen. The process is carried out with a temperature in the reaction zone maintained generally in the range of about 300° C. to as high as 600° C. The pressure of operation, for the most benefits, is of the order of 100 to 250 pounds per square inch gauge, but the principles of the invention are applicable at lower pressures and the benefits are obtained in lesser degree.

The proportions of chlorine to ethane component of the feed reactants can be varied through a substantial range according to the products desired and according to the concentration of the ethane stream so that the thermal characteristics overall of the operation can be varied from exothermic through adiabatic to substantial endothermic conditions while maintaining substantially isothermal conditions in the reaction zone. As mentioned above, the total transverse area of the feed jets of premixed gases to the reaction zone proper should not exceed about five percent of the transverse area of the reaction zone proper, and in addition the individual jets should be less than about one-half inch in diameter, preferably less than one-fourth inch, and the size of the openings should not be below a practical limit of about $\frac{1}{16}$ of an inch.

As already indicated above, a highly advantageous attribute of the process is the fact that it is capable of continued and very extended operation without difficulty occasioned by coking or plugging within the reaction zone proper. It is found, however, that a small but measurable amount of carbon deposition occurs and this deposition or formation is evident in two ways. It is found that the stable inorganic solids become coated initially with a high carbon polymeric material and in addition that the effluent gases contain minute carbon fines, of the order of 0.01 to 0.02 grains per cubic foot of gas at standard pressure and temperature conditions. As is discussed in more detail hereafter, the possibility of conducting the chlorination reaction at an elevated temperature provides an ideal source of energy for a novel mode of even further purifying the product gas of these carbon fines, said method utilizing the potential energy of the compressed reactant gases, and reducing the carbon loading to 0.0001 to 0.0005 grains per cubic foot.

In all embodiments of the process the feed streams are premixed prior to introduction into the reaction zone proper. From the figures and examples given hereafter, it will be seen that it is inherent in the operation that some of the fluidized solids become admixed with the gases even prior to their entry into the reaction zone, a relationship has been discovered whereby the heat released to the feed gases in such instances is maintained below the level which results in pre-reaction prior to the entry of the gases in the reaction zone proper. It will be understood that this pre-reaction would be equivalent to conventional thermally initiated chlorination operations and would be subject to the same limitations.

The fundamental attributes of the process will be readily understood, and its preferred mode of operation exhibited, by the following detailed description and examples. The figure attached hereto shows a schematic representation of a typical installation and flow pattern representative of typical embodiments of the process.

Referring to the figure, the principal components of an installation include a reactor 11, and purifying or ancillary equipment including a scrubbing device 21, a disengaging drum 31, and a feed hopper for solids 41 for occasional introduction of fresh solids to the system. The reactor 11 includes a feed zone 12, a reaction zone 13, and a disengaging zone 14. A vertical discharge line 15 is provided to withdraw solids from within the reaction zone 13. A valve 16 permits occasional discharge of a portion of the solids from the reaction zone as desired into lines 17. An inert gas line 9, permits introduction of gas into the discharge line 15 to maintain the solids in the fluidized state therein.

The feed zone 12 is separated from the reaction zone 13 by a plate or distribution device 18, which can be a plate with a plurality of orifices uniformly distributed over its surface. The chlorine feed line 19 is joined by a hydrocarbon feed line 20, the thus manifolded line 10 being extended an appreciable distance before entering the feed zone 12 of the reactor 11.

Overhead products from the reactor, after having passed upwardly through the disengaging zone 14 are discharged through an overhead line 22 and are then fed to a mixing device 21, which is also supplied with an inert scrubbing liquid 23. A mixed gas-liquid-solid stream hereafter defined is thus discharged through a line 24 to a disengaging drum or cyclone 31, which is provided to allow separation of the gas phase from the liquid phase and solids, an overhead gas line 32 being provided for the former, and a bottoms line 33 being provided to discharge the liquid and entrained solids.

Occasionally, as is described hereafter, it is desirable to provide feed of additional solids to a reaction system when under operating pressure. A solids hopper 41, generally surmounting or positioned above the reaction 11 is connected thereto by a stand pipe 42, fitted with double valves 43, 44. A high pressure inert gas line 45 is provided to feed the stand pipe 42 between the block valves 43, 44 for purposes hereafter described.

In the operation of a process illustrated by the figure as described above, chlorine and an ethane containing stream are fed through the respective feed line 19, 20 and passed through the mixing line 10, the time of transmittal being sufficient to thoroughly mix these components. The thus mixed gas enters the feed space 12, and passes as relatively high velocity jets through the above mentioned orifices in the distribution plate 18 into the reaction zone.

The chlorine and hydrocarbon streams react vigorously, almost immediately adjacent the distribution plate 18 and in the presence of a fluidized solids mass contained in the reaction zone, which, however, extends a vertical distance exceeding the actual reaction zone by a several fold depth. The reaction is very rapid and chlorine under all normal circumstances within the scope of the process is virtually entirely consumed. The resultant product mixture is passed into the disengaging zone 14, wherein the velocity is reduced owing to the increase in diameter so that the amount of fines carry over is appreciably diminished. The amplitude of the disengaging zone 14 is in reality a secondary or extra safety factor inasmuch as the solids distribution is such that very small quantities of fines are entrained even at the top of the reaction zone 13. In all cases, however, very minute quantities of freshly deposited or formed carbonaceous material, of the order of a few microns in particle size, are entrained in the effluent gases, which are discharged through line 22 to the mixing device 21. The mixer 21 is essentially a fluid flow apparatus for converting the elevated pressure and velocity head of the product gases into turbulent energy to a great extent and in the presence of an inert, low viscosity liquid which is capable of wetting the predominantly carbon particles. This liquid is introduced under pressure as necessary through line 21, and the vigorous agitation achieved owing to the inherent energy of the product gas stream is utilized in disengaging the solids entrained and incorporating them in the liquid phase introduced by the line 23. The thus formed gas-liquid-solids stream passes to the disengager 31 where adequate residence time is provided for the liquid to settle out, and then discharged (with the solid fines entrained therein) to subsequent usage. The thus solids-free product gases are then discharged through an overhead line 32 to subsequent recovery operations.

As already mentioned, the solids feed system including a hopper 41 is employed upon occasion to add fresh solids to the reactor 11. In the operation of the solids feed system, the block valve 43 is opened while the lower block valve 44 is closed, and the short section of the stand pipe 42 between the valves is then filled by gravity introduction of the solids. The upper block valve 43 is then closed snugly, and the upper section of the stand pipe 42 is pressurized by an inert gas admitted through line 45 to a pressure exceeding the pressure of the reactor system 11. Then the lower block valve 44 is opened and the solids are admitted by gravity flow into the reactor space. The upper section of the stand pipe is purged of reactants by being pressurized with inert gas admitted through line 45 and then venting through a vent line 46.

Although, as is discussed in more detail hereafter, a particular benefit of the present process is the relatively small amount of fouling and build up of foreign matter on the solids in the system, some such deposition does occur, and it is occasionally necessary to discharge solids from the system during operation. Or, alternatively, when for process reasons a different proportion of solids in the reaction zone 13 is desired, it is sometimes necessary to discharge a substantial amount of solids to alter the fluidized solids total depth. In such instances, solids are removed through the discharge line 15 as desired.

One of the particular benefits of the present invention is its great flexibility so that examples illustrating the fullest scope of the possible embodiments thereunder are not feasible. As a typical example of a moderate pressure ethane chlorination, the following Example I is illustrative.

EXAMPLE I

Chlorine gas was fed through line 19 and a commercially available predominantly ethane gas was fed through line 20. The composition of the ethane gas was approximately 65 mole percent ethane and 30-25 mole percent methane, the gas also including minor quantities of hydrogen, nitrogen, and other minor impurities. The gases were apportioned in the ratio providing a mole ratio averaging 0.5 mole of chlorine per mole of ethane. The reaction zone 13 proper was maintained at a pressure of approximately 10 pounds per square inch gauge. The charge of solids to the reaction zone 13 was about 185 pounds of sand per square foot of cross sectional area. These solids as charged had the following approximate size distribution:

| Size range, through and retained on U. S. mesh screens | Weight percent |
|---|---|
| +80 | 38.6 |
| 80–100 | 36.5 |
| 100–140 | 21.3 |
| 140–170 | 2.0 |
| 170–230 | 1.4 |
| Through 230 | 0.2 |

The rate of feed of the pre-mixed cold gases was sufficient to provide a superficial linear velocity in the reaction zone 13 of approximately 1.5 feet per second, this resulting in fluidization of the solids to a depth of about two feet. The temperature in the feed zone 12 averaged about 50–75° F., and the average temperature in the reaction zone 13 was about 800° F. (430° C.). Complete conversion of the chlorine was experienced, and the overhead gases upon analysis showed a product distribution (on the excess ethane-methane, hydrogen chloride and impurities free basis) as follows:

| Component: | Mole percent |
|---|---|
| Ethyl chloride | 88.5 |
| 1,1-dichloroethane | 6 |
| Ethylene | 5 |

In addition, minor quantities of higher chloroethanes were obtained. The foregoing corresponds to yields of the respective products on the basis of the ethane converted. To illustrate a reaction at somewhat higher pressures, the following is typical.

EXAMPLE II

The operation described in Example I was repeated, except that the pressure on the reaction zone 13 was maintained at about 35–40 pounds per square inch gauge. Similar results were obtained. In this example, as well as in the preceding example, the temperature in the mixed feeding zone 12 was substantially below 100° F. and the temperature in the reaction zone was approximately 750° F. (450° C.) in the reaction zone 13.

As already briefly mentioned, one of the particular benefits of the invention is the ease with which the desired reaction can be conducted at elevated pressures substantially above the pressures given in the foregoing examples. Elevated pressure operation has numerous positive benefits which have not heretofore been realizable, these benefits including a high capacity per unit of volume of reactor space available, and the discharge of effluent gases at a sufficiently elevated pressure so that liquefaction of condensable components of a product stream is possible with only a moderate coolant medium.

It has now been discovered that elevated pressure operation, particularly above a pressure level of about at least 100 pounds per square inch gauge results not only in the foregoing advantages but certain unexpected and highly beneficial additional benefits, these however, being derivable with some adjustments of process variables as hereafter explained. The general performance of a repetitive series of chlorinations of ethane over a wide range of pressure is given in the following table. In the chlorination operations of which the following table presents the results, the same procedure as described in connection with Example I was followed, except that the pressure on the reaction zone 13 was varied as tabulated.

| Run | Mole ratio, $Cl_2/C_2H_6$ | Temp., °C. | Pressure, p.s.i.g. | Mole percent product distribution—Excess ethane and hydrogen chloride free basis | | | | | | |
|---|---|---|---|---|---|---|---|---|---|---|
| | | | | Ethylene, $C_2H_4$ | Ethyl chloride, $C_2H_5Cl$ | Vinyl chloride, $C_2H^3Cl$ | Dichloroethane, 1,1-$C_2H_4Cl_2$ | Dichloroethane, 1,2-$C_2H_4Cl_2$ | Dichloroethylene | Trichloroethane, 1,1,1-$C_2H_3Cl_3$ |
| III | 0.276 | 355 | 10 | 3.5 | 92.5 | 0.3 | 3.5 | | | |
| IV | 0.417 | 395 | 14 | 4.1 | 88.4 | 0.8 | 5.0 | 0.2 | 0.3 | 1.2 |
| V | 0.295 | 350 | 52 | 3.1 | 90.5 | 0.2 | 5.5 | 0.6 | 0.1 | |
| VI | 0.315 | 360 | 92 | 1.0 | 95.1 | 0.2 | 3.3 | 0.3 | | 0.1 |
| VII | 0.313 | 370 | 200 | 0.7 | 90.9 | 1.4 | 4.8 | 2.2 | | |

In all the foregoing runs, the chlorine consumption was substantially 100 percent complete, in other words there was no preceptible chlorine in the product overhead stream. The total contact time in the reaction and disengaging zone of the reactor 11 was of the order of 2 to 3 seconds, but the quantity of fluidized sand present in the reaction zone 13 was so modest that the contact time in the presence of the solids was only of the order of one to two seconds.

As already discussed briefly, the merits of the process are not confined to a process specifically pointed to the production of the maximum amount of ethyl chloride. In certain situations it will be preferred to obtain a product having a high proportion of saturated trichloroethanes, or unsaturated dichloroethanes. This result can be achieved by providing a particularly high chlorine to ethane ratio in the feed stream, even to the point at which an "endothermic" reaction is carried out, or alternatively, a two-stage sequential operation can be conducted, in which two sets of apparatus similar to that shown in the figure are arranged in series, and the product gas from the first reactor, after discharge therefrom is passed to a second reaction zone. Illustrative of the applicability of the process to such demands is the following example showing the chlorination of a dichloroethane stream.

EXAMPLE III

Chlorine gas and vaporized 1,1-dichloroethane were fed to a reaction system such as is illustrated in Figure 1 and described by Example I. The chlorine and 1,1-dichloroethane vapor were thoroughly mixed prior to intrdouction to the feed zone 12. In a typical operation in a repetitive series of varying chlorine : feed stream ratios, the reactor was maintained at a temperature of about 450° C. and substantially all the chlorine was reacted. The product distribution, as mole percent, was as follows, for a feed ratio of 0.25 moles chlorine per mole of dichloroethane.

| Components | Weight percent |
|---|---|
| Vinyl chloride, $C_2H_3Cl$ | 27.7 |
| 1,2-dichloroethane, $C_2H_4Cl_2$ | 2.2 |
| Dichloroethylenes | .6 |
| Trichloroethanes | 69.5 |

From the foregoing description, it is seen that the process affords an ideal method of obtaining valuable higher chloroethanes from lower chlorinated materials, in conjunction with a first stage ethane chlorination if desired.

The outstanding benefit of the process is evidenced by the ability to maintain isothermal conditions throughout the reaction zone under an extremely wide range of conditions. Thus, a uniform temperature profile, top to bottom, is realizable even though the over all process heat balance can be termed exothermic, adiabatic, or endothermic. These terms are used herein not in the conventional physical chemical sense, which refers these criteria to reactants at, and products at, a constant temperature level. Instead the terms are used herein in a process sense. Elaborating for clarity upon this distinction, when the term adiabatic is used herein it signifies that the process is self-sustaining with respect to the feed streams at the entrant conditions and the product streams at the discharge conditions. It is customary in many cases that the entrant streams be at only ambient temperatures, and that the product streams be at temperature levels of the order of 750° F. (450° C.). When "adiabatic" process conditions are obtained in the present process with such temperature conditions, it signifies that actually the heat released in the reaction is taken up as sensible heat of the feed components, including any inert or relatively non-reactive diluents, in being heated up to the discharge temperature. By a similar analysis, the term "exothermic" in the present environment again refers to over all process conditions referred to actual streams and temperature levels. Thus, as in the foregoing situation, if the same temperature levels were being maintained, but the combination of chlorine to ethane ratio, reactor proportions, and relative absence of inert diluents or non-reactive components were such that an actual extraction of heat was essential, the process would be considered "exothermic." Similarly, for the "endothermic" embodiment, in that environment a net flow of heat to the reaction zone from an external source is essential.

From the foregoing comments it is obvious that whereas an analysis based upon idealized heats of formation might predict for the actual reaction experienced in the process one of the several variants (exothermic, endothermic, or adiabatic) indicated above, the actual characterization of the process is more complex in that it is effected by factors extraneous to the actually occurring major reaction. The implication of this is that in operation considerable latitude is afforded without penalizing to a great degree the results desired. For example, when throughputs and chlorine ratios to ethane in the feed stream are such that an "exothermic" operation would be provided, an "adiabatic" condition is readily provided by dilution of the feed streams with either an inert gas such as nitrogen, or even methane, or a recycled stream high in methane. An additional technique for accomplishing an exothermic process involves the use of a heat exchange surface within the reaction zone. An extraneous coolant liquid can be used therein. Alternatively and very effectively, such a cooling line can be employed to vaporize, at a desired pressure, a liquid chlorine supply. When the condition would give an "endothermic" operation, the heat flow to the process can be supplied in several manners. Most advantageously, one or both of the feed streams may be preheated above the normal ambient supply temperature level, but not above a temperature level resulting in pre-reaction of the chlorine and ethane.

The absence of direct heat flux across the reactor zone boundary walls is a characteristic of most embodiments of the process. Hence, special start-up procedures are required. The process is readily initiated by pre-heating one of the reactants or both of the reactants if desired before introducing to the feeding zone before the partition or distribution device to the reaction zone. Generally, although the requisite temperature for initiation is somewhat variable according to factors cited below, it is desirable to thus add sufficient heat by means of a preheating operation to raise the temperature of the mixed feed gases to a level of the order of 300° C. (575° F.) or over, this temperature level being calculable on the basis of solely the specific heats of the components. As already explained above, the preheating technique suitable for start-up operations may be similarly used in embodiments of the process where an "endothermic" operation would result.

The finely divided solids employed in the process are introduced into the reaction zone prior to any gas flow therethrough normally. The solids will to a very small extent drop through the openings provided for the introduction of the premixed feeds at relatively high velocity into the reaction zone proper, but inasmuch as such solids will not be heated, they will not function adversely as is possible if the limits of the desired operation, as discussed hereafter, are deviated from during actual operation. Thus, in this situation, the solids thus inadvertently admitted to the feeding zone of a process will eventually be entrained and reintroduced into the reaction zone.

Not only is thermal initiation for start-up quite feasible as described, but in addition it is similarly feasible to introduce as an added component to the feed streams a readily chlorinatable material, that is, chlorinatable at ambient temperatures, so that heat is evolved in situ in amount sufficient to initiate the desired chlorine - ethane reaction. Inasmuch as the chlorine - ethane reaction is exothermic in the physical chemical sense, this will result in a rapid heat up of the reaction zone solids to the point where steady state operation is achieved. Additional modes of initiating the process would include catalysts for releasing free ethyl radicals, such as tetraethyllead or azeomethane, which will facilitate initiating reaction.

A highly significant variable in process operation is the chlorine:ethane ratio, and the product distribution can be varied at will within a wide range to provide a desired product distribution. It has been found that the product distribution generally is dependent to a very great extent on this variable, although as mentioned later, certain features possible in the operation do allow further adjustment. Restating this, although for a given pressure and temperature operation, the chlorine:ethane ratio is determinative of the products distribution regardless of the presence of inert or substantially inert components in the feed, temperature and pressure can be adjusted to provide additional re-distribution of the product component concentration.

To illustrate a typical effect of variation of chlorine:ethane feed ratio upon product distribution, the following table is illustrative.

chloro- and higher chloroethanes. It is further to be noted that accompanying the increase in relative proportion of the higher chloroethanes and of the vinyl chloride produced at the cited temperature, the product includes a substantial amount of ethylene which is a result of, apparently, dehydrochlorination of probably ethyl chloride initially formed. This result is of particular utility in conjunction with the integration of a chlorination process directed to making higher chloroethanes operated jointly with a hydrochlorination operation. It will be understood that when the ratio of chlorine to ethane is increased over unity—say for example to 1.5—and the chlorination reaction is accompanied by complete reaction of the chlorine, that a substantial proportion of the ethane entered is then automatically converted to ethylene. By appropriate product separation means and rectification, an ethylene enriched gas stream is thus made available for recycling to the afore mentioned hydrochlorination process, and since this ethylene is derived from very economically produced ethane, this latitude of control permits very simple adjustment of joint products to the most economical levels. The data presented above in the foregoing table represent average performance in a spread of reaction zone temperatures of from about 680° F. (360° C.) to a temperature of up to 840° F. (450° C.), for the data for ratios below about 0.8 mole of chlorine to one mole of chlorine. For the data above this ratio, all the operations were at a temperature of about 400° C. The spread and results in a large number of runs was not excessive although there was some variation. The operations wherein such results were obtained were similar to the reaction technique described in Example I except that the ethane fed was relatively high in concentration, comprising from 95 to 99 mole percent, and the fluidized solids employed were finely divided graphite having a bulk density of about 0.7 grams per milliter, and a particle size distribution as cited below.

| Mesh Size: | Weight percent |
|---|---|
| 70–100 | 18 |
| 100–120 | 20 |
| 120–140 | 23 |
| 140–270 | 39 |

A solids loading of 40 pounds per square foot was employed.

The temperature of operation is, from the viewpoint of obtaining full and complete conversion of chlorine, relatively flexible providing that the temperature is sufficiently elevated to assure initiation and maintenance of the reaction. Thus, we have obtained excellent reaction at 350° to 500° C. (660° F. to 930° F.), and within the range of about 350° to 450° C. we find only a moderate spread in chlorine conversion to ethyl chloride. However, this spread increases significantly above chlorine to ethane mole ratios of about 0.3. Thus, where the

| Mole ratio, $Cl_2/C_2H_6$ | Average product distribution—Mole percent—Hydrogen chloride and excess ethane free basis | | | | | | |
|---|---|---|---|---|---|---|---|
| | Ethyl chloride, $C_2H_5Cl$ | Dichloroethanes, $1,1\text{-}C_2H_4Cl_2$ | Ethylene, $C_2H_4$ | Vinyl chloride, $C_2H_3Cl$ | Trichloroethanes, $1,1,1\text{-}C_2H_3Cl_3$ | Dichloroethanes, $1,2\text{-}C_2H_4Cl_2$ | Other |
| 0.2 | 95.5 | 4 | ← | | 0.5 | | → |
| 0.4 | 90 | 7 | ← | | 3.0 | | → |
| 0.6 | 84 | 10.5 | ← | | 5.5 | | → |
| 0.8 | 76 | 15 | 8.5 | ← | 0.5 | | → |
| 1.0 | 67 | 18 | 12.5 | ← | 7.5 | | → |
| 1.2 | 54 | 23 | 16.4 | 4 | ← | 2.6 | → |
| 1.4 | 38 | 26 | 20.5 | 7.5 | 4 | ← 4 | |
| 1.6 | 22.5 | 28 | 28 | 12 | 6.5 | 2.0 | 3.0 |
| 1.8 | 8.5 | 25 | 32 | 19.0 | 10 | 2.0 | 4.0 |

From the foregoing table it is readily seen that the product distribution can be varied from an extremely high proportion of ethyl chloride when desired, to very low quantities accompanied by very substantial amounts of dichlorine:ethane feed ratio is only about 0.1:1 to 0.2:1, the spread in product distribution is not sufficient to be of concern. Hence, from the standpoint of product distribution in the cited chlorine:ethane ratio range, full operability and flexibility are achieved from 350° to 500° C. At higher chlorine:ethane mole ratios, the effect of temperature on product distribution does become much more pronounced. Thus, it has been found, for example, that at a 0.6:1 chlorine:ethane mole ratio, operating at atmospheric pressure and with a fluidized graphite treated solids as mentioned in the foregoing table, that the mole percent in the product stream varies approximately and generally as follows.

| Temperature, °C.: | Mole percent ethyl chloride in product |
|---|---|
| 350 | 87 |
| 400 | 83 |
| 450 | 81.5 |
| 500 | 78 |

Although the temperature is relatively flexible insofar as operability and chlorine conversion and, to a certain extent, the conversion to ethyl chloride or product distribution generally, several other factors make temperature a more limited factor for variation in certain respects. One of the characteristics of the present process is that following a relatively brief conditioning period, the solids within a system approach a steady state even though fine high carbon polymeric material is produced in varying proportions. It has been found that the amount of this ancillary degradation production is a variable function of temperature, and further that there is some variation above a certain feed ratio. In the range of chlorine:ethane mole feed ratios of 0.15:1 to 0.6:1, the carbon build up in a typical small scale test operation was as tabulated below.

| Temperature, °C.: | Carbon build up, parts by wt./hr. |
|---|---|
| 350 | 0.65 |
| 400 | 0.3 |
| 450 | 0.24 |
| 500 | 0.35 |
| 520 | 0.9 |
| 600 | 9.0 |

From the foregoing table it is observed that a highly preferred temperature range is in the region of about 400 to 500° C. at atmospheric pressure. A similar correlation has been observed for feed ratios of above 0.6:1.0. In the range of a feed ratio of above 0.6:1 to about 1:1 or higher, a similar preferred range of 400 to about 470 or 480 is observed, although the rate of build up generally is substantially higher. A further factor upon which temperature has a significant effect arises with respect to the occasional presence of oxygen or oxygen containing gases as an impurity. Very fortunately, it has been discovered that the optimum and preferred range of temperatures with respect to carbonization as cited above is similarly and non-predictably the optimum range with respect to counteracting adverse effect of oxygen in the reaction system. It has been discovered that a concentration of up to about one mole percent of oxygen can be tolerated without adverse effect in the process if the reaction zone temperature is maintained above about 400° C. (750° F.). Below this temperature level, starting at about 375° C., the oxygen appears to be detrimental to chlorine conversion. At higher pressures, this temperature is lower. It is extremely fortunate that the present process counteracts the adverse effect of an oxygen as a chain reaction inhibitor inasmuch as in many instances a chlorine source available will be contaminated with air. It will be noted that the tolerable limit of oxygen corresponds generally to a dilution of at least five volume percent air in the chlorine or even more, and this degree of contamination or dilution is in excess of any proportion normally encountered in commercial operation.

The operation of the reaction section at elevated pressure has a number of very desirable and non-foreseeable advantages. As would be expected, the delivery of a product gas from an elevated pressure operation makes it possible for more efficient subsequent recovery operation. In addition, the stored energy inherent in the pressurized products from the pressurized reactor are ideally suited to the elimination of minute dust particles entrained in the product gas. However, it has further been discovered that in a range of, for example, about 100 to 250 pounds per square inch gauge, that very important additional benefits are realized, particularly in embodiments of the process directed toward high conversion of ethane reacted to ethyl chloride.

These non-anticipated benefits are primarily three in number and are inter-related. Firstly, it has been discovered that an increase in pressure results in a greater rate of reaction for the chlorination of the ethane. It is then possible that an equivalent production rate can be achieved at elevated pressure at lower temperatures than would be required at nominal or low pressures. Alternatively, for higher production, greater production can be provided without increasing temperature requirements.

The utilization of a lower temperature than would be predicted as required for a given chlorine:ethane ratio becomes of particular signficance when, as in substantially all commercial situations, the ethane feed stream is contaminated or rather is accompanied by, certain chlorinatable components. Commercially available ethane supplies usually include methane in the proportions of 0.1:1 mole per mole of ethane, and frequently varying amounts of ethylene. Both methane and ethylene are generally more resistant to one step chlorine substitution than is ethane. However, it has been determined that the ratios of reaction rate constants, for ethane chlorination relative to methane chlorination, decreases as a function of temperature and this contributes very significantly to the feasibility of utilizing a non-pure ethane stream. Thus, not only does pressure operation provide an absolute increase in reaction rates, but the lower temperatures, made possible by higher pressures, result in an increase in ethane chlorination rate relative to chlorination of co-present methane. This result is particularly beneficial when the desired product is ethyl chloride. The foregoing is illustrated by the following table.

*Ratio of chlorination rate constants*
$k_{(C2\ compounds)}/k_{(CH4)}$

| Feed ratio, chlorine:ethane | 350° C. | 400° C. | 450° C. |
|---|---|---|---|
| 0.4 | 24.5 | 22 | 22 |
| 0.6 | 24 | 21 | 20 |
| 0.8 | 24 | 20.7 | 18.2 |
| 1.0 | | 20.1 | 16.8 |
| 1.2 | | | 15 |

In the foregoing table, it will be noted that the ratio expressed is of the reaction rate constant of "$C_2$ compounds" to the rate constant for methane chlorination. This expression was used because no correction was made for the portion of the reaction comprising further chlorination of ethyl chloride to dichloroethanes or higher chlorinated compounds. At low mole ratios of chlorine to ethane, the data given approach realistically the ratio of the reaction rate constant of chlorination of ethane, to ethyl chloride, to the ratio of the reaction rate constant for methane chlorination.

The benefits accompanying the use of higher pressures can be expressed in terms of the "chlorine break through temperatures." This temperature represents the temperature level at which the capacity of a given system at otherwise constant conditions, is insufficient to maintain complete chlorine conversion. It is found that this minimum temperature is reduced with higher pressures, generally according to a relationship which can be approximately expressed as $$T = K - cP$$

where
$T$ = temperature, °C. at which chlorine break through occurs,
$K$ = constant,
$c$ = a constant,
$P$ = pressure, pounds per square inch gauge.

The explicit constants in this generalized relationship will vary according to factors, but the following example is suitable for determination of appropriate temperature ranges in many instances in the pressure range of 100 to 250 pounds per square inch gauge:

$$T = 325 - 0.18 P$$

This relationship was derived for a chlorine to ethane ratio of about 0.4:1, and a superficial linear velocity of about 1.5 feet per second. With an ethane or mixed feed including substantial amounts of diluents or relatively inert components, a somewhat higher temperature would be desirable.

A further desirable feature of the conditions accompanying the process is that the ranges are such that the fluidization characteristics of the reaction zone system are substantially solely a function of the superficial linear velocity. In other instances of fluidized solids operation, the fluidizing characteristics are dependent to some extent upon the density of the gaseous or fluid phase being contacted with the solids. Hence, one would expect the permissible superficial linear velocities or preferred range to be a variant with pressure inasmuch as the mass is directly proportional to the absolute pressure. Under the ranges of conditions exercised in the present operation, it is found, however, that the desired range of superficial linear velocities is dependent primarily on the size distribution of the solids, and should be in the range of about 0.3 to about 3 feet per second, the preferred range being 1.0 to 2 feet per second.

Accompanying this range of superficial linear velocity is the desirable range of contact time of the reactants and product gases with the fluidized mass, which of course can be similarly expressed in terms of dead loading per square foot of reaction area. Substantial operations have been carried out with subdivided solids loading varying from 40 to 250 pounds per square foot. In operation of the process with the indicated superficial linear velocities, considerable expansion upon fluidization occurs of course and results in contacting time of the order of one to two seconds, or corresponding to an expanded bed depth of about one-half to three feet.

A significant factor and benefit of the process is the apparent substantial absence of a scale up factor associated with or accompanying different length:diameter (L:D) ratios for different sized installations. Thus, substantially the same results have been obtained in large operations with L:D ratios of 0.42:1 up to 20:1. This shows that the reaction of the chlorine and ethane occurs very close to the feed device; hence the back mixing which would be expected to alter the product distribution in a large operation, does not effect the results adversely in the present case.

A substantial variety of inorganic solids are suitable for the initial charge to the reaction zone as the solids for the fluidized contacting. Among the materials which have been employed quite advantageously are the following:

Graphite
Active alumina
Alundum
Silicon carbide
Mullite
Sand

It will be observed that these materials have appreciably variable densities, from about 2.2 for sand up to about 4 for fused alundum. It is found generally that materials having a density of 2 to 2.5 are preferred. In actuality, the fluidized solids within the reactor section are, with respect to their actual operation, equivalent to predominantly carbon particles. In other words, the solids as charged rapidly become coated with a highly carbonaceous material which is the effective contact surface with the reactive gases. For control purposes in the operation of the process with non-carbon base solids, it is desired to maintain the average carbonaceous content of the solids in actual use in the range of about 10 to 20 weight percent.

The respective sized fractions of the mixed solids have somewhat variant carbon content, the finer fractions having a higher proportion of carbon. There is some build up of the larger particles by means of carbon to a larger size than is desired, and, in a typical installation, a small but steady stream can be removed through the stand pipe 15 of the apparatus illustrated by the figure. Withdrawal of said oversized solids through a line 17 for crushing and re-introduction through the stand pipe 42 is a customary procedure.

In those embodiments of the process wherein a strongly exothermic over all operation is provided, it is customary to make the withdrawn stream of solids through the down comer 15 sufficiently large that the desired isothermal condition within the reaction zone 13 and at the desired temperature level, can be maintained. In such embodiments, the hot solids withdrawn through the line 17 are cooled to ambient temperature and then re-introduced. The purge line 9 permits the introduction of either an inert gas such as nitrogen or a relatively inert hydrocarbon such as methane or a portion of the feed to both fluidize the down coming solids and purge any residual reactant gases therefrom.

Further with reference to "exothermic" processes, the skewing of relative reaction rate constants, with pressure increases, in favor of chloroethanes formation makes possible a highly advantageous internal cooling operation by employing a recycle stream. According to this embodiment, the methane content in a reaction system is built up by recycling a high methane stream obtained after recovery of the chlorinated products. Thus, the hydrocarbon stream is increased in methane content to a proportion of up to about one mole of methane to one mole of ethane fed, and high yields of chloroethanes will nevertheless be obtained. This recycling is of significance particularly when operating at high chlorine to ethane ratios, of the order of 0.7 to 1.8 moles per mole of ethane.

A wide variety of details can be altered in any specific apparatus for an embodiment of the process. The most variations will be with respect to the design of the distribution device. One of the modes of designing such a distributor is to provide sharp edged orifices therein, but alternatively short straight walled nozzles can be employed, and in some instances it will be desirable to provide openings having a venturi type configuration. As a very desirable adjunct to this distribution apparatus, a relatively finely woven screen has been positioned very slightly below the distribution plate. The function of this screen is to minimize to a great extent the amount of pre-reaction which can occur within the feed space when the solids distribution, chlorine:ethane ratio, and rate of feed is such that the solids portion falling back intermittently through the distribution plate holes would cause a great degree of pre-reaction in the feed space. Accordingly, a stainless steel screen having a mesh size of $\frac{1}{16}$ of an inch or smaller is frequently very beneficial.

The materials of construction of the apparatus are similarly subject to considerable variation, and in substantially all instances it will be found that mild steel is quite adequate.

Having described the invention in full, what is claimed is as follows:

An improved process for the chlorination of an ethane stream in the presence of impurities including oxygen contaminant comprising forming an intimate mixture of gaseous chlorine and an ethane containing feed stream having a methane diluent, the proportions of chlorine being from about 0.3 to 0.5 mole of chlorine to one mole of ethane, and introducing said intimate mixture to a feed zone immediately adjacent and below a vertical, uncooled, reaction zone, then passing said intimate mixture into said reaction zone in a plurality of jets substantially uniformly transversely distributed across said reaction zone, said jets being not more than about one-half inch in diameter and having a total transverse area of from about 0.5 to 1.5 percent of the transverse area of the reaction zone; the reaction zone containing finely divided carbonaceous inorganic solids in a quantity of from about 40 to 250 pounds per square foot of transverse area thereof and predominating in particles passing a 60 mesh screen and retained on a 140 mesh screen, the said mixed feeds being introduced thereto in quantity corresponding to a superficial linear velocity of from about 1 to 2 feet per second thereby fluidizing finely-divided solids in the reaction zone, the reacting gases in the reaction zone being maintained at a pressure of about 100 to 250 pounds per square inch and a temperature of from about 350 to 450° C., whereby there is no ascertainable temperature gradient within the fluidized solids within the said reaction zone.

References Cited in the file of this patent

UNITED STATES PATENTS

| | | |
|---|---|---|
| 1,920,282 | Vivas | Aug. 1, 1933 |
| 2,593,338 | Ogorzaly | Apr. 15, 1952 |
| 2,664,967 | Molstedt | Jan. 5, 1954 |

FOREIGN PATENTS

| | | |
|---|---|---|
| 513,947 | Great Britain | Feb. 21, 1939 |

OTHER REFERENCES

Frankenburg et al., "Advances in Catalysis," volume VI, Academic Press Inc., 1954, page 322.